United States Patent
Raja K et al.

(10) Patent No.: US 8,931,833 B2
(45) Date of Patent: Jan. 13, 2015

(54) SELF-ADJUSTING HEAD RESTRAINT

(71) Applicants: Mahendra Raja K, Trichur (IN); Kannan Subramanian, Kancheepuram (IN); Manoranjan Kanakaraj, Chennai (IN)

(72) Inventors: Mahendra Raja K, Trichur (IN); Kannan Subramanian, Kancheepuram (IN); Manoranjan Kanakaraj, Chennai (IN)

(73) Assignee: Chrysler Group LLC, Auburn Hills, MI (US)

( * ) Notice: Subject to any disclaimer, the term of this patent is extended or adjusted under 35 U.S.C. 154(b) by 69 days.

(21) Appl. No.: 13/659,192

(22) Filed: Oct. 24, 2012

(65) Prior Publication Data

US 2013/0106162 A1 May 2, 2013

Related U.S. Application Data

(60) Provisional application No. 61/552,704, filed on Oct. 28, 2011.

(51) Int. Cl.
*A47C 1/02* (2006.01)
*B60N 2/48* (2006.01)
*B60N 2/30* (2006.01)

(52) U.S. Cl.
CPC ............ *B60N 2/4855* (2013.01); *B60N 2/4864* (2013.01); *B60N 2/487* (2013.01); *B60N 2/3011* (2013.01)
USPC ......................................................... 297/61

(58) Field of Classification Search
USPC .................. 297/61, 284.1, 391, 378.1, 404
See application file for complete search history.

(56) References Cited

U.S. PATENT DOCUMENTS

| | | | | |
|---|---|---|---|---|
| 2,705,994 A | * | 4/1955 | Stattler | .......................... 297/105 |
| 2,742,957 A | * | 4/1956 | Young | ...................... 297/452.42 |
| 6,550,856 B1 | * | 4/2003 | Ganser et al. | .................... 297/61 |
| 6,631,954 B2 | * | 10/2003 | Amorin et al. | ............. 297/378.1 |
| 6,688,697 B2 | | 2/2004 | Baumann et al. | |
| 6,824,212 B2 | | 11/2004 | Malsch et al. | |
| 7,118,171 B2 | * | 10/2006 | Fowler et al. | .................... 297/61 |
| 7,344,191 B2 | | 3/2008 | Schilling et al. | |
| 2010/0019559 A1 | | 1/2010 | Smith | |

FOREIGN PATENT DOCUMENTS

| | | |
|---|---|---|
| DE | 3829470 C1 * | 10/1989 |
| DE | 4219941 A1 | 12/1993 |
| DE | 102005020276 B3 | 9/2006 |

(Continued)

OTHER PUBLICATIONS

International Search Report dated Jan. 24, 2013 for International Application No. PCT/US2012/061551, International Filing Date Oct. 24, 2012.

(Continued)

*Primary Examiner* — Milton Nelson, Jr.
(74) *Attorney, Agent, or Firm* — Ralph E Smith

(57) ABSTRACT

A vehicle seat may include a seat bottom, a seatback and a head restraint. The seatback may engage the seat bottom and may be movable relative thereto between a normal use position and a second position. The head restraint may be coupled to the seatback and may include front and rear portions attached to each other for relative movement therebetween. The front and rear portions may define a first thickness when the seatback is in the normal use position and a second thickness when the seatback is in the second position.

18 Claims, 13 Drawing Sheets

(56) References Cited

FOREIGN PATENT DOCUMENTS

| | | |
|---|---|---|
| DE | 102007048151 B3 | 1/2009 |
| DE | 102009008064 A1 | 3/2010 |

OTHER PUBLICATIONS

Written Opinion dated Jan. 24, 2013 for International Application No. PCT/US2012/061551, International Filing Date Oct. 24, 2012.

* cited by examiner

SELF-ADJUSTING HEAD RESTRAINT

CROSS-REFERENCE TO RELATED APPLICATION

This application claims the benefit of U.S. Provisional Ser. No. 61/552,704, filed Oct. 28, 2011.

FIELD

The present invention relates to a head restraint for a seat, and more particularly to a self-adjusting head restraint.

BACKGROUND

Seats for a vehicle such as an automotive vehicle, a boat or an aircraft, for example, may include a seat bottom, a seatback and a head restraint. When a passenger or driver of the vehicle is sitting in the seat, the head restraint may support the passenger's or driver's head during sudden forward acceleration of vehicle or when the passenger or driver wishes to rest his or her head against the head restraint while relaxing or sleeping, for example.

SUMMARY

In one form, the present disclosure provides a vehicle seat that may include a seat bottom, a seatback and a head restraint. The seatback may engage the seat bottom and may be movable relative thereto between a normal use position and a second position. The head restraint may be coupled to the seatback and may include front and rear portions attached to each other for relative movement therebetween. The front and rear portions may define a first thickness when the seatback is in the normal use position and a second thickness when the seatback is in the second position.

In another form, the present disclosure provides a head restraint for a seat that may include a support member and front and rear portions. The support member may engage the seat. The front portion may be attached to the support member. The rear portion may be connected to the front portion and may be movable between first and second positions relative to the front portion and the support member. The first and second portions may cooperate to form a head restraint body having a first thickness in the first position and a second thickness in the second position.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
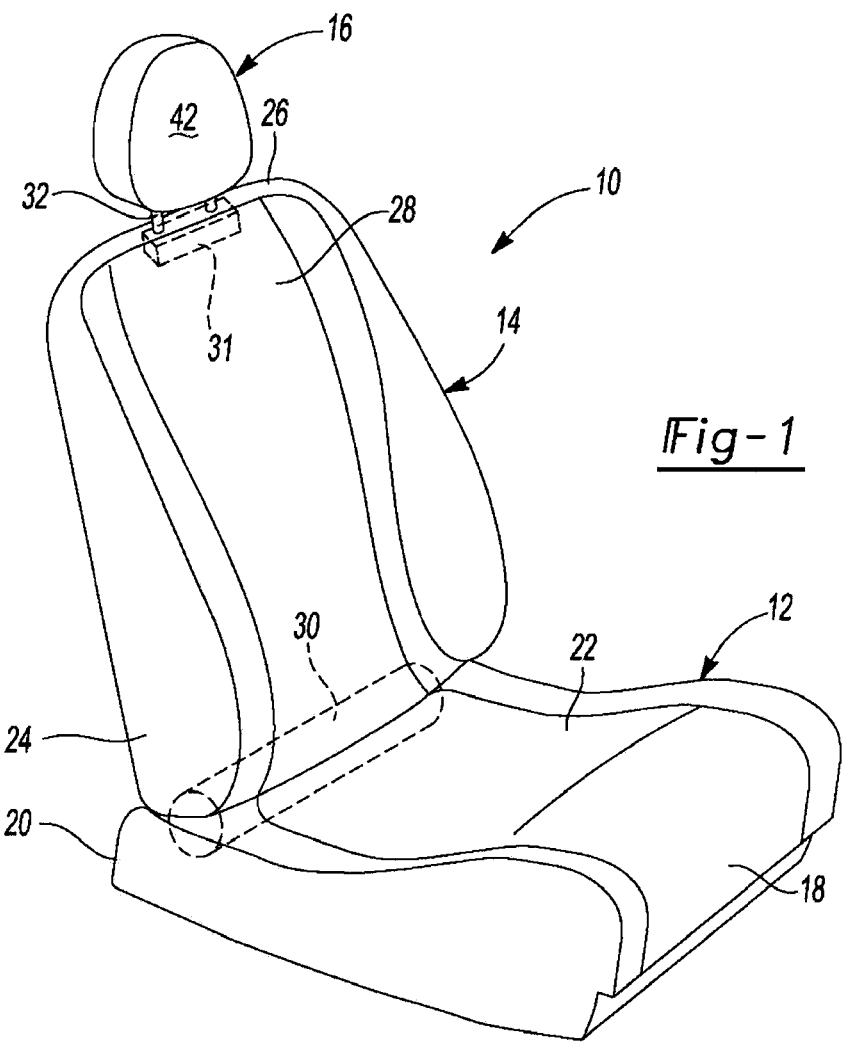
FIG. 1 is a perspective view of a seat in a use position according to the principles of the present disclosure.
Figure 2:
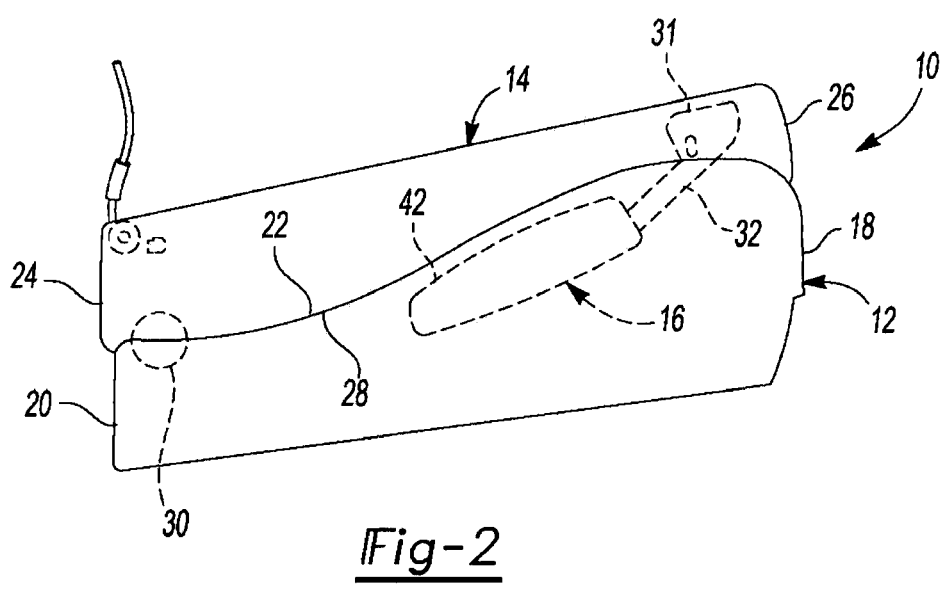
FIG. 2 is a side view of the seat of FIG. 1 in a stowed position according the principles of the present disclosure.

With reference to FIGS. 1-8, a seat 10 is provided and may include a seat bottom 12, a seatback 14, and a head restraint assembly 16. The seat 10 may be installed in a vehicle such as an automotive vehicle, a construction or industrial vehicle, a military vehicle, a marine vehicle, or an aircraft, for example. The seatback 14 may be movable relative to the seat bottom 12 and the head restraint assembly 16 may be movable relative to the seat bottom 12 and the seatback 14 between a use configuration (FIG. 1) and a stowed configuration (FIG. 2). As will be subsequently described, the head restraint assembly 16 may be adjustable between a first position (FIG. 5) having a first thickness and a second position (FIG. 6) having a second thickness that is less than the first thickness.

The seat bottom 12 may include a front end 18, a rear end 20 and an upward-facing surface 22. The seat bottom 12 may be positioned within the vehicle such that the front end 18 is disposed between the rear end 20 and a front end of the vehicle. A passenger or driver of the vehicle may sit on the upward-facing surface 22 of the seat bottom 12.

The seatback 14 may include a lower end 24, an upper end 26 and a backrest surface 28. A recliner mechanism 30 (shown schematically in FIGS. 1 and 2) may couple the lower end 24 of the seatback 14 to the rear end 20 of the seat bottom 12 to selectively allow the seatback 14 to pivot relative to the seat bottom 12 between the use configuration and the stowed configuration. The upper end 26 may include a hinge assembly 31 (shown schematically in FIGS. 1 and 2) pivotably supporting the head restraint assembly 16. The recliner mechanism 30 and the hinge assembly 31 may include release mechanisms that selectively lock the seatback 14 and the head restraint assembly 16, respectively, in the use position.

The head restraint assembly 16 may include a support member 32, a front housing 34, a rear housing 36, and a spring member 37. While not specifically shown in the figures, a layer of cloth, leather or other fabric or upholstery may encase front and rear housings 34, 36. The support member 32 may include a pair of generally vertically extending members 38 and a generally horizontally extending member 40. The horizontally extending member 40 may include a serpentine shape and may interconnect the vertically extending members 38. The vertically extending members 38 may pivotably engage the hinge assembly 31 and extend from the upper end 26 of the seatback 14. The vertically extending members 38 and/or the horizontally extending member 40 may fixedly engage the front housing 34 and cooperate to support the front and rear housings 34, 36. While the vertically extending members 38 and the horizontally extending member 40 are shown in the figures being integrally formed with each other, in some embodiments, the vertically and horizontally extending members 38, 40 could be separate and discrete components that are connected together.

The front housing 34 may include an outer surface 42 and an inner surface 44 and a resiliently compressible foam and/or elastomeric padding member 46 disposed therebetween. The inner surface 44 may be formed from a relatively rigid polymeric or metallic material, for example, and may define a recess 48. The inner surface 44 may engage the outer surface 42 via a snap fit, staking, fasteners, adhesive bonding and/or any other suitable fastening means. A plurality of first attachment members 50, a plurality of second attachment members 52, a plurality of third attachment members 54, a plurality of first projections 56, a second projection 58, and a pair of barbs 59 may extend from the inner surface 44 toward the rear housing 36. The first, second and third attachment members 50, 52, 54 may engage the support member 32 and may cooperate to fixedly secure the front housing 34 to the support member 32. The first and second attachment members 50, 52 may be generally hook-shaped and may engage the horizontally extending member 40 and the vertically extending members 38, respectively, via snap fits. A spring clip 62 may cooperate with each of the third attachment members 54 to engage the vertically extending members 38. The front housing 34 may also include a flap portion 65 (FIG. 8) that may be deflectable between first and second positions to facilitate assembly of the support member 32 to the front housing 34.

Each of the first projections 56 may extend from the inner surface 44 toward the rear housing 36 and may include a first aperture 64 extending therethrough. Opposing lips 66 may extend into each of the first apertures 64. The second projection 58 may include a second aperture 68 extending therethrough and one or more latch members or barbs 70 extending laterally inward from a perimeter of the second aperture 68.

Figure 5:
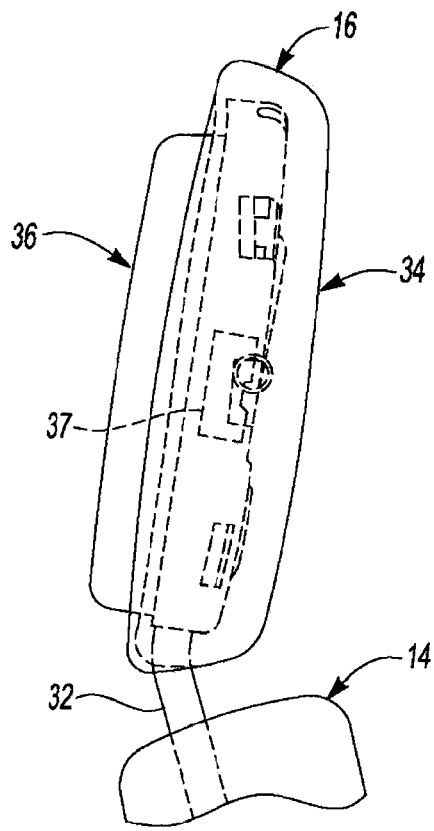
FIG. 5 is a side view of the head restraint assembly in a first position and having a first thickness.
Figure 6:
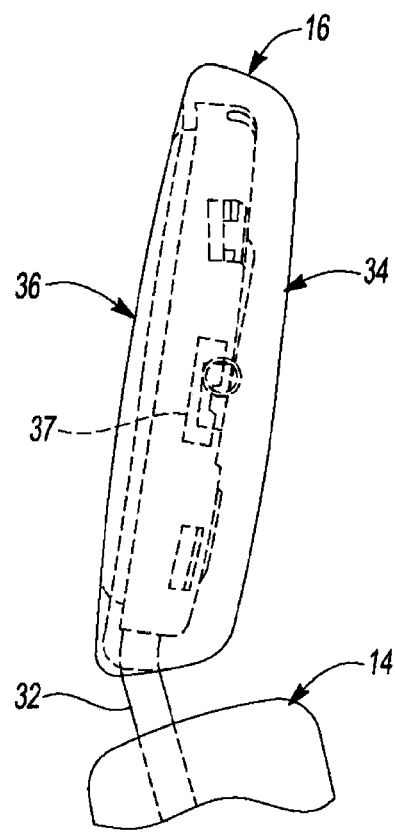
FIG. 6 is a side view of the head restraint assembly in a second position and having a second thickness.

The rear housing 36 may include an inner surface 72 defining a recess 74. The inner surface 72 may face the inner surface 44 of the front housing 34 and may cooperate with the inner surface 44 to define a cavity therebetween. A plurality of first protuberances 76 and a second protuberance 78 may extend from the inner surface 72 of the rear housing 36 and may be received within the first and second apertures 64, 68, respectively, of the first and second projections 56, 58, respectively. The first and second protuberances 76, 78 may be slidable within the first and second apertures 64, 68, respectively, between the first position (FIG. 5) and the second position (FIG. 6).

Figure 7:
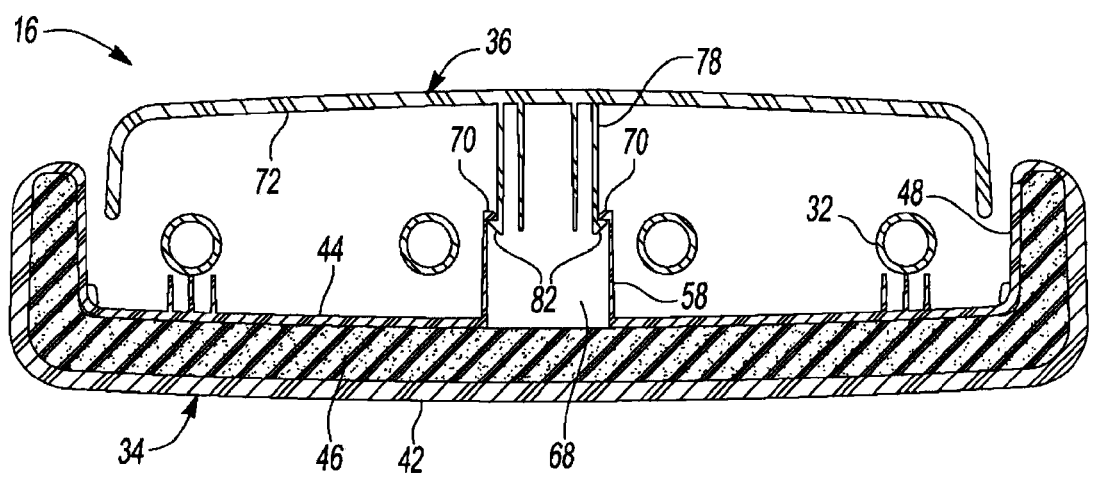
FIG. 7 is a cross-sectional view of the head restraint assembly.
Figure 8:
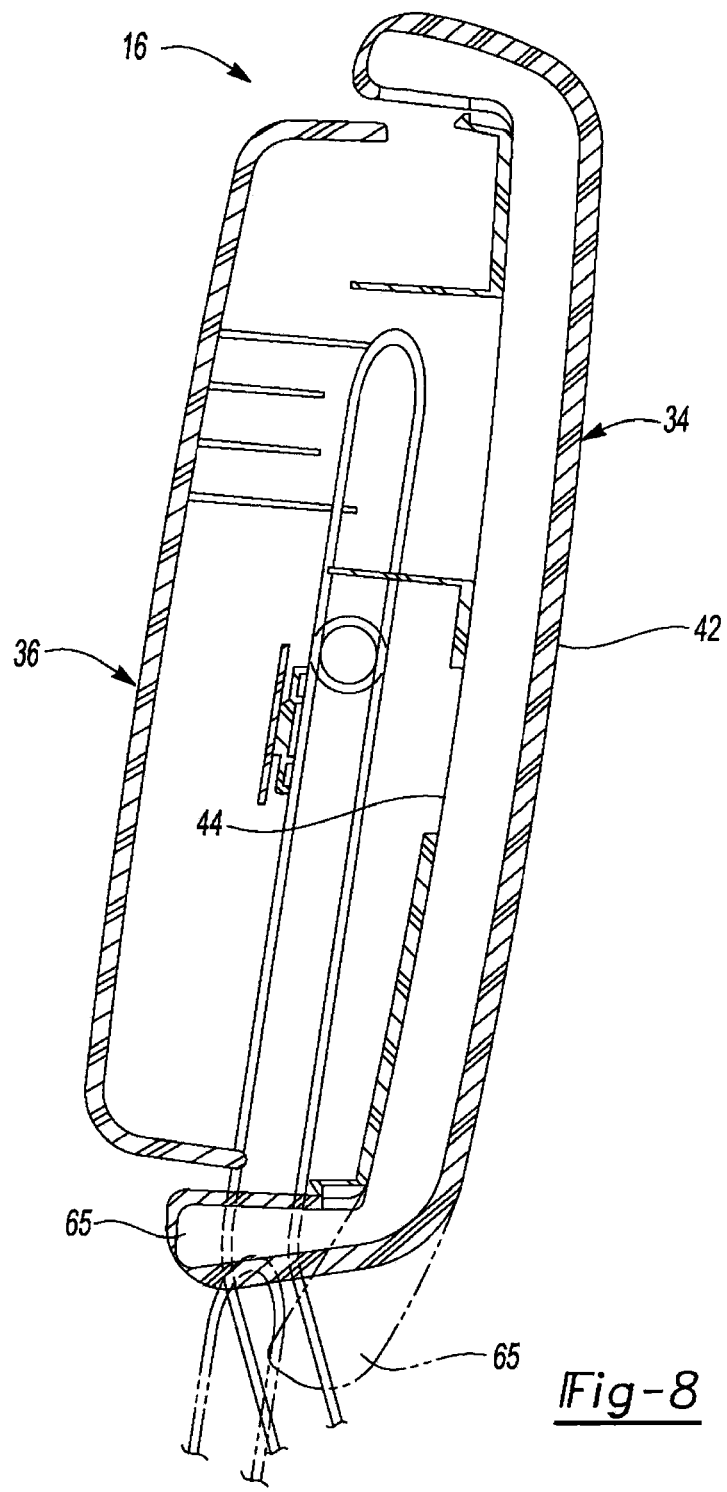
FIG. 8 is a cross-sectional view of the head restraint assembly including a movable flap according to the principles of the present disclosure.

Each of the first protuberances 76 may include a pair of opposing flexible barbs 80 corresponding to the lips 66 on the first projections 56. The second protuberance 78 may include a pair of opposing flexible barbs 82 corresponding to the barbs 70 on the second projections 58. To assemble the rear housing 36 to the front housing 34, first and second protuberances 76, 78 may be inserted into the first and second apertures 64, 68, respectively in the front housing 34. To insert the first protuberance 76 into the first aperture 64, the barbs 80 may be snapped into engagement with the lips 66. Likewise, to insert the second protuberance 78 into the second aperture 68, the barbs 82 may be snapped into engagement with the barbs 70 (as shown in FIG. 7). In this manner, the projections 56, 58 and the protuberances 76, 78 may cooperate to form a linkage or mechanism allowing slidable movement of the rear housing 36 relative to the front housing 34 between the first position (FIG. 5) and the second position (FIG. 6).

Figure 3:
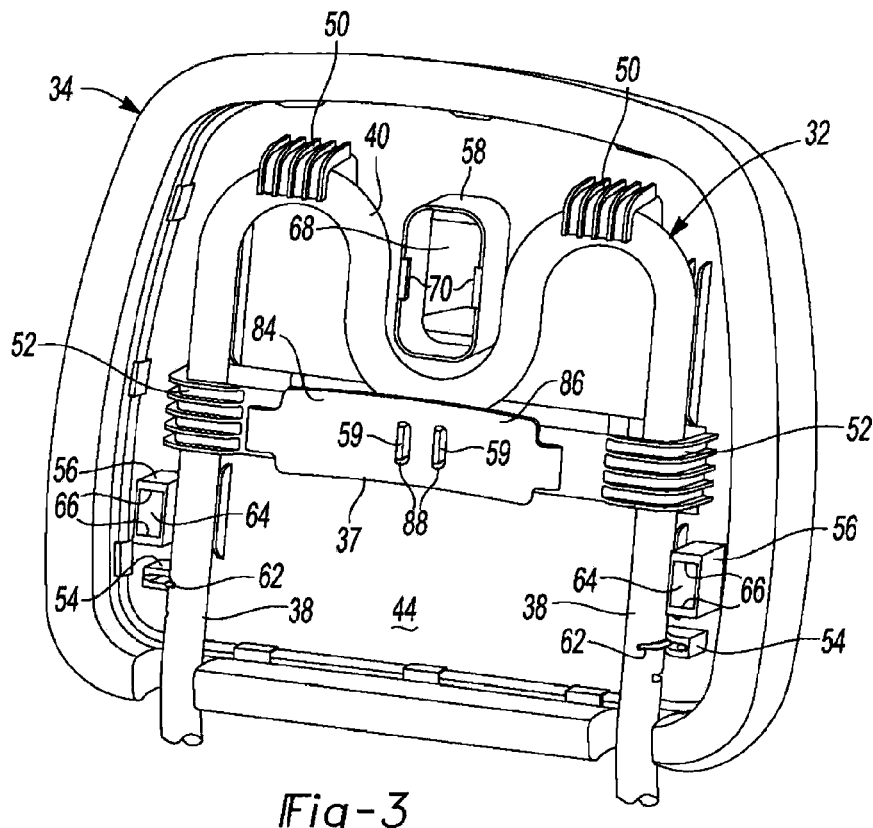
FIG. 3 is a perspective view a front housing of a head restraint assembly according to the principles of the present disclosure.
Figure 4:
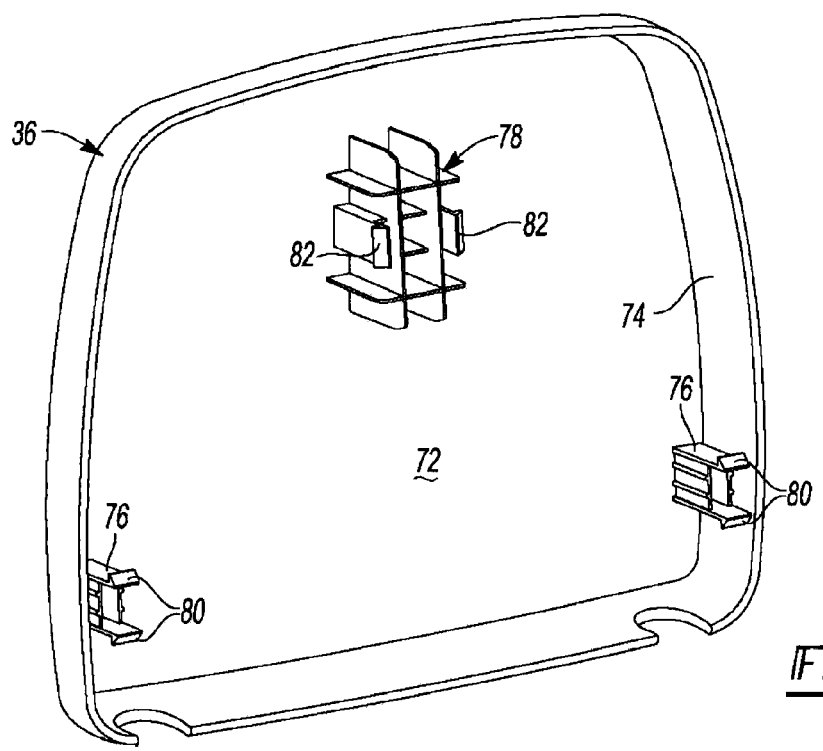
FIG. 4 is a perspective view of a rear housing of the head restraint assembly according to the principles of the present disclosure.

The spring member 37 may be mounted to the front housing 34 and/or the rear housing 36. While the spring member 37 is shown in FIG. 3 as being a leaf spring, in some embodiments, the spring member 37 may be a coil spring, for example, or any other type of spring. In the particular embodiment shown in FIG. 3, the spring member 37 may include first and second curved portions 84, 86 extending generally laterally outward and toward the rear housing 36. While the rear housing 36 is engaged with front housing 34, the first and second portions 84, 86 of the spring member 37 may contact the inner surface 72 of the rear housing 36 and may bias the rear housing 36 toward the first position (FIG. 5), i.e., away from the front housing 34. The spring member 37 may include a pair of apertures 88 disposed between the first and second portions 84, 86 that engage the pair of barbs 59 extending from the inner surface 44 of the front housing 34 via a snap fit. It will be appreciated that, in some embodiments, the spring member 37 may be secured to the front housing 34 in any other suitable manner, such as via mechanical or heat staking, threaded fasteners and/or an adhesive bond, for example.

With continued reference to FIGS. 1-8, operation of the seat 10 will be described in detail. As described above, the seatback 14 may be pivotable relative to the seat bottom 12 between the use position (FIG. 1) and the stowed position (FIG. 2). The head restraint assembly 16 may be pivotable relative to the seatback 14. In the use position, the seatback 14 may be generally upright relative to the seat bottom 12 to enable a driver or passenger of the vehicle to sit in the seat 10 with his or her back against the backrest surface 28 of the seatback 14 and the head restraint assembly 16 may be generally upright relative to the seatback 14. To move the seat 10 into the stowed position, the head restraint assembly 16 may be folded downward (relative to the configuration shown in FIG. 1) such that the outer surface 42 of the front housing 34 is in contact with and/or facing the backrest surface 28 of the seatback 14. Then, the seatback 14 may be folded downward into the stowed position such that the front and rear housings 34, 36 are disposed between the backrest surface 28 and the upward-facing surface 22 of the seat bottom 12.

When the seat 10 is in the stowed position, the head restraint assembly 16 may be compressed between the seat bottom 12 and the seatback 14 by the weight of the seatback 14. This compression force may over come the biasing force of the spring member 37 and urge the rear housing 36 toward the front housing 34, thereby reducing the overall thickness of the head restraint assembly 16 to that of the second thickness (FIG. 6). Reducing the thickness of the head restraint assembly 16 to the second thickness allows the seat 10 to be packaged into a smaller, more compact volume, thereby increasing the amount of cargo space within the vehicle in which the seat 10 is installed. When the seatback 14 is moved back toward the upright use position, the compression force is reduced or eliminated, allowing the spring member 37 to bias the rear housing 36 back to the first thickness (FIG. 5). Interference between the barbs 80 and the lips 66 and interference between the barbs 82 and the barbs 70 may limit the travel of the rear housing 36 away from the front housing 34. Stated another way, interference between the barbs 80 and the lips 66 and interference between the barbs 82 and the barbs 70 may prevent the rear housing 36 from separating from the front housing 34 beyond a desired amount.

It will be appreciated that the thickness of the head restraint assembly 16 may be adjusted by any force urging the rear housing 36 toward the front housing 34. That is, even if the seatback 14 is in the use position and the head restraint assembly 16 is in an upright position relative to the seatback 14, a sufficiently strong force applied to the rear housing 36 urging the rear housing 36 toward the front housing 34 may cause the rear housing 36 to move toward the front housing 34 against the biasing force of the spring member 37 to reduce the thickness of the head restraint assembly 16. When such a force is eliminated or sufficiently reduced, the spring member 37 may urge the rear housing 36 back to the first position (FIG. 5).

Figure 9:
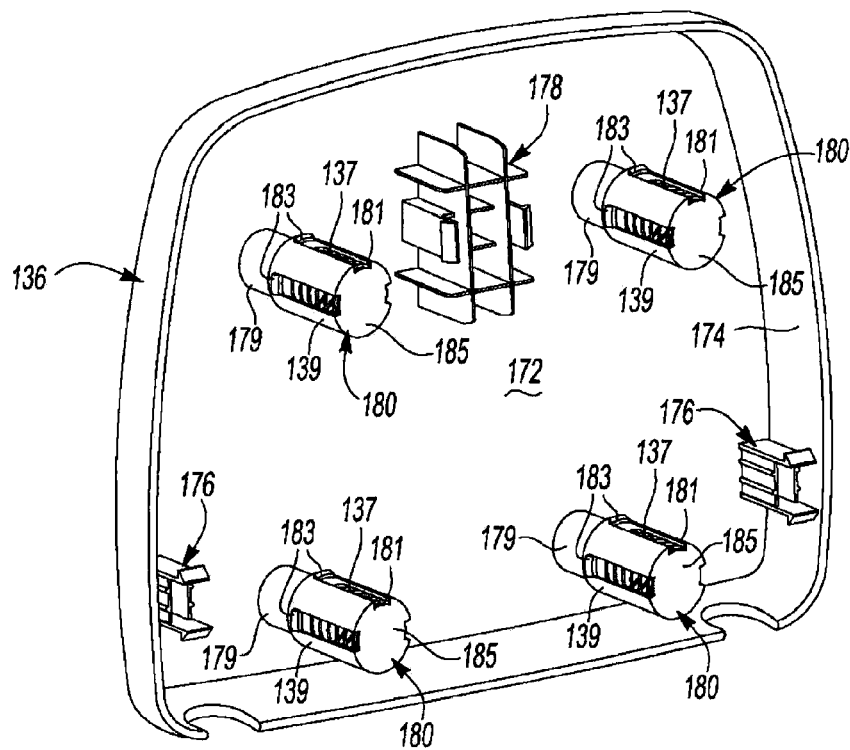
FIG. 9 is a perspective view of another rear housing according to the principles of the present disclosure.
Figure 10:
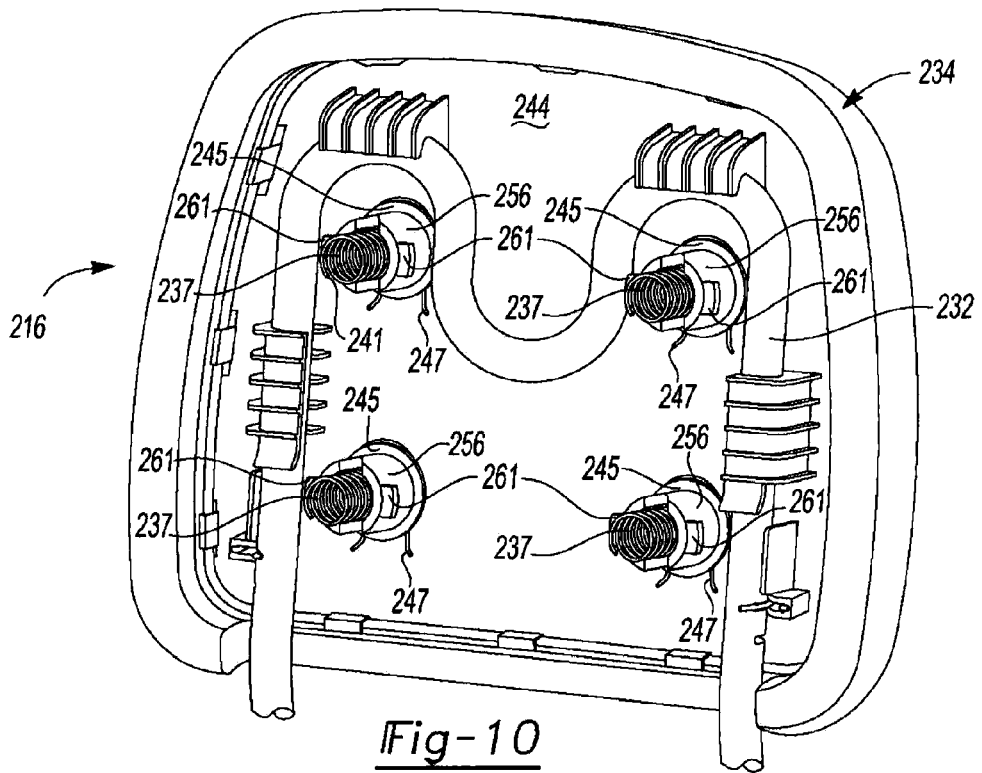
FIG. 10 is a perspective view of a front housing of another head restraint assembly according to the principles of the present disclosure.
Figure 11:
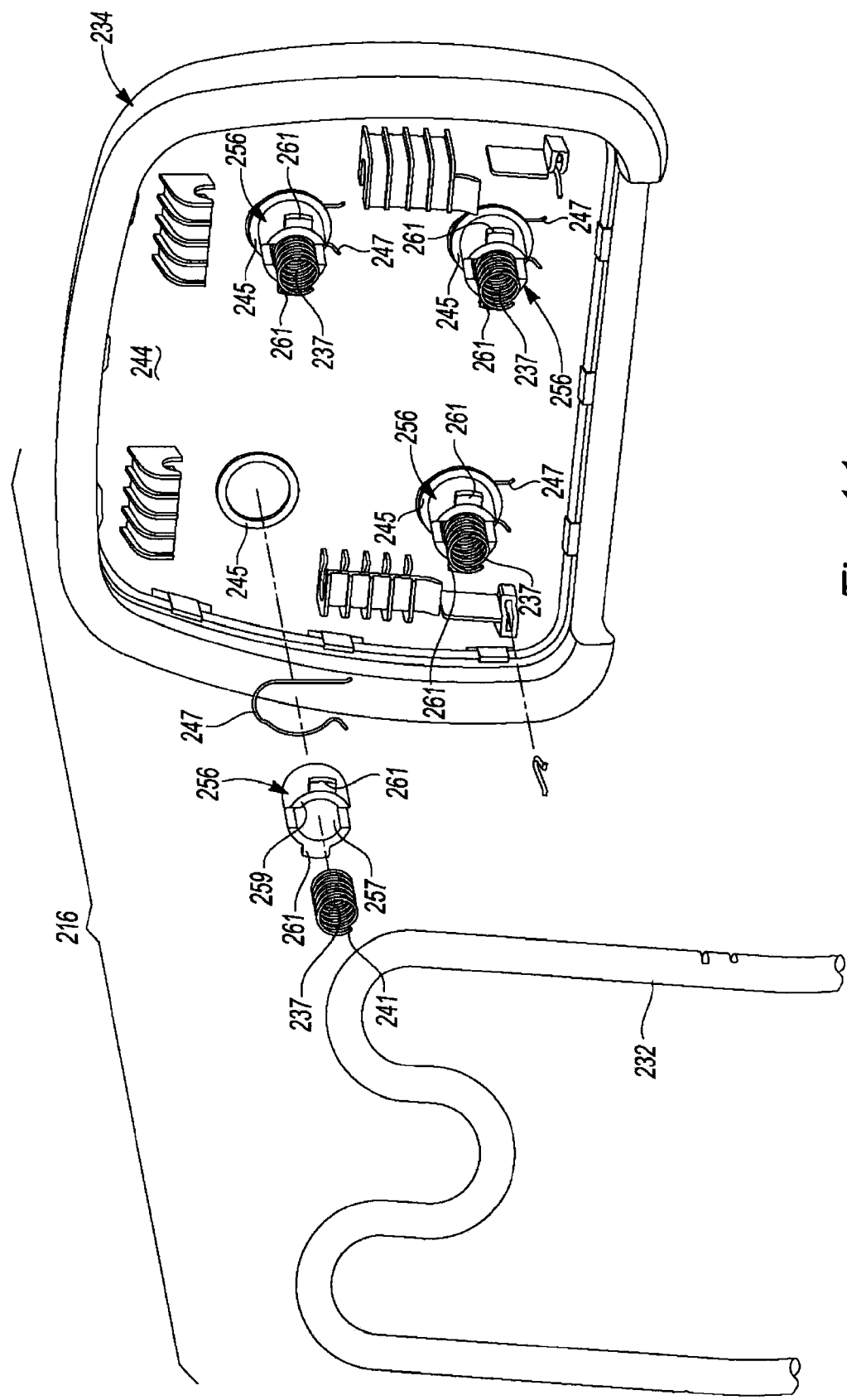
FIG. 11 is a partially exploded perspective view of the front housing of FIG. 10.

With reference to FIG. 9, another rear housing 136 is provided that may be incorporated into the head restraint assembly 16 in the alternative to the rear housing 36 described above. The structure and function of the rear housing 136 may be substantially similar to that of the rear housing 36 described above, apart from any exceptions noted below and/or depicted in the figures. Briefly, the rear housing 136 may include an inner surface 172 defining a recess 174 and having first and second protuberances 176, 178 extending therefrom and slidably engaging the first and second apertures 64, 68 of the front housing 34. The first and second protuberances 176, 178 may be substantially similar to the first and second protuberances 76, 78 described above.

The rear housing 136 may also include a plurality of spring-seat posts 179 extending from the inner surface 174 toward the front housing 34. A plurality of spring assemblies 180 may engage the spring-seat posts 179 and may be provided in addition to or in the alternative to the spring member 37 described above to bias the rear housing 136 away from the front housing 34 (i.e., toward the first position having the first thickness). Each of the spring assemblies 180 may include a spring member 137 and a spring cap 139. The spring caps 139 may receive the spring members 137 and may include slots 181 that engage lips 183 on the distal ends of the spring-seat posts 179. In this manner, the spring caps 139 may be slidable along the lengths of the spring-seat posts 179. Closed ends 185 of the spring caps 139 may abut the inner surface 44 of the front housing 34 such that the spring members 137 may bias the rear housing 136 away from the front housing 34. In some embodiments, the closed ends 185 of the spring caps 139 may be adhesively bonded or otherwise fixed to the inner surface 44 of the front housing 34.

With reference to FIGS. 10-13, another head restraint assembly 216 is provided that may be incorporated into the seat 10. The head restraint assembly 216 may include a support member 232, a front housing 234, and a rear housing 236. The structure and function of the support member 232 and the front and rear housings 234, 236 may be substantially similar to that of the support member 32 and the front and rear housings 34, 36 described above, apart from any exceptions noted below and/or depicted in the figures.

The front housing 234 may include a plurality of clip retainers 245, a plurality of spring clips 247, a plurality of projections 256, and a plurality of spring members 237. The clip retainers 245 may be annular members integrally formed with or adhesively bonded to an inner surface 244 of the front housing 234. Slots 249 (FIG. 12) may be formed in opposing sides of the clip retainers 245 that may engage the spring clips 247. The projections 256 may be generally tubular members defining a cavity 257 having an open end 259 with flanges 261 extending radially outward therefrom. The spring members 237 may be coil springs and may include a first end 239 and a second end 241. The first end 239 may be received in the cavity 257 of the corresponding one of the projections 256. The projections 256 may be seated within the clip retainers 245. The spring clips 247 may engage the slots 249 in the clip retainers 245 and engage outer diameters of the projections 256 to retain the projections 256 to the inner surface 244 of the front housing 234. In some embodiments, the projections 256 may engage barbs extending from the inner surface 244 via a snap fit. In other embodiments, the projections 256 may be integrally formed with the inner surface 244 or staked, adhesively bonded or otherwise fixed thereto.

Figure 12:
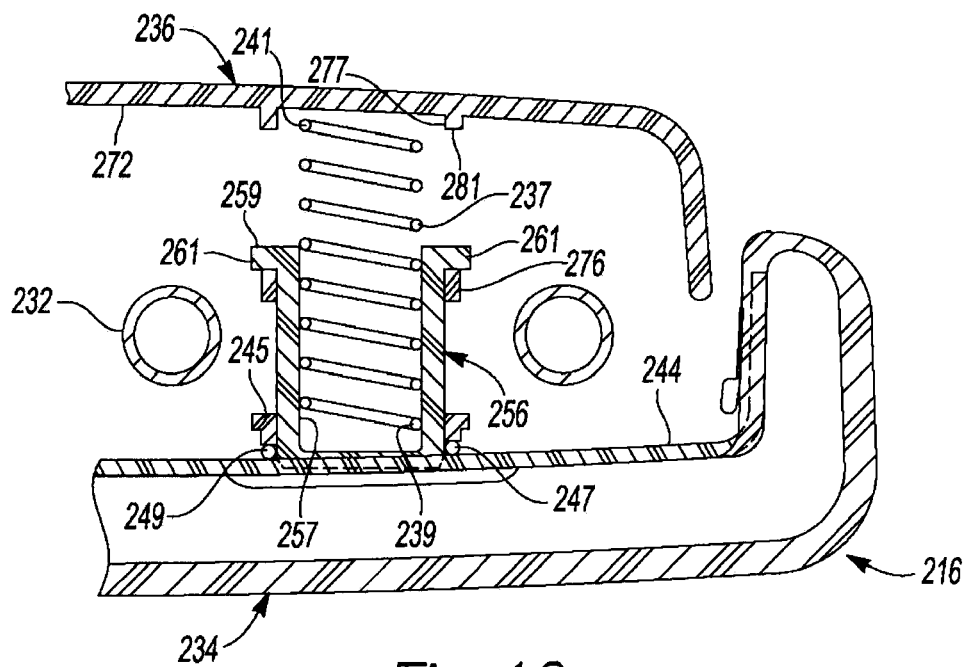
FIG. 12 is a partial cross-sectional view of the head restraint assembly.
Figure 13:
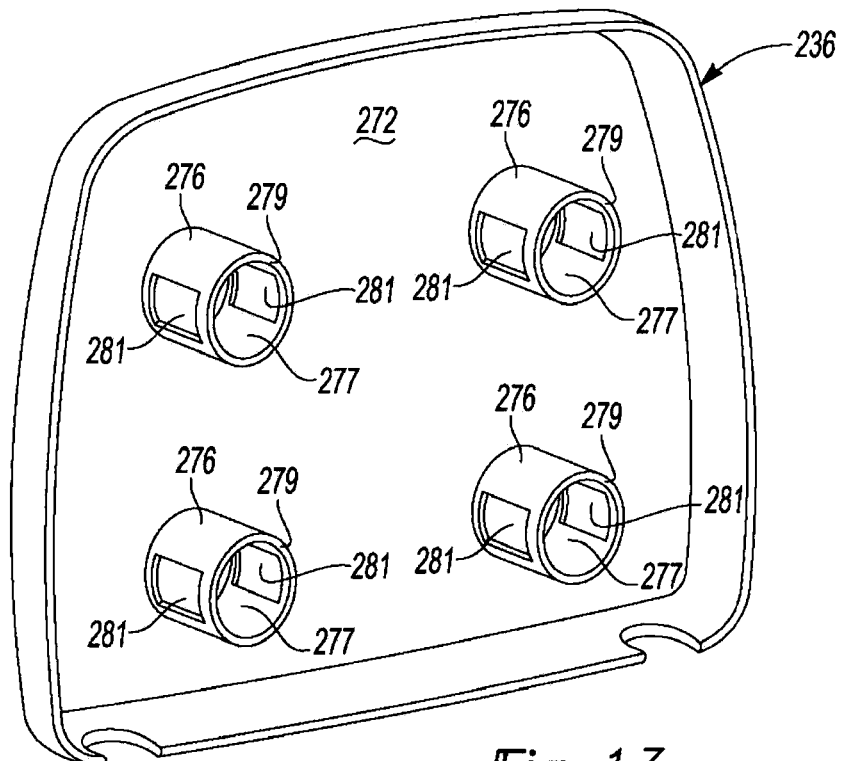
FIG. 13 is a perspective view of the rear housing of the head restraint assembly of FIG. 12.

The rear housing 236 may include an inner surface 272 having a plurality of protuberances 276 extending outward therefrom. The protuberances 276 may be generally tubular members each defining a cavity 277 having an open end 279. The second ends 241 of the spring members 237 may be received in the cavities 277 and may abut the inner surface 272. Each of the protuberances 276 may also include a plurality of slots 281 in communication with the cavity 277. The open ends 259 of the projections 256 may also be received in the cavities 277 such that the flanges 261 of the projections 256 may engage the slots 281 in the protuberances 276, as shown in FIG. 12. In this manner, the projections 256 may reciprocate within the protuberances 276 between the first position and the second position to adjust the thickness of the head restraint assembly 216. The spring members 237 may bias the rear housing 236 away from the front housing 234 (i.e., toward the first position).

Figure 14:
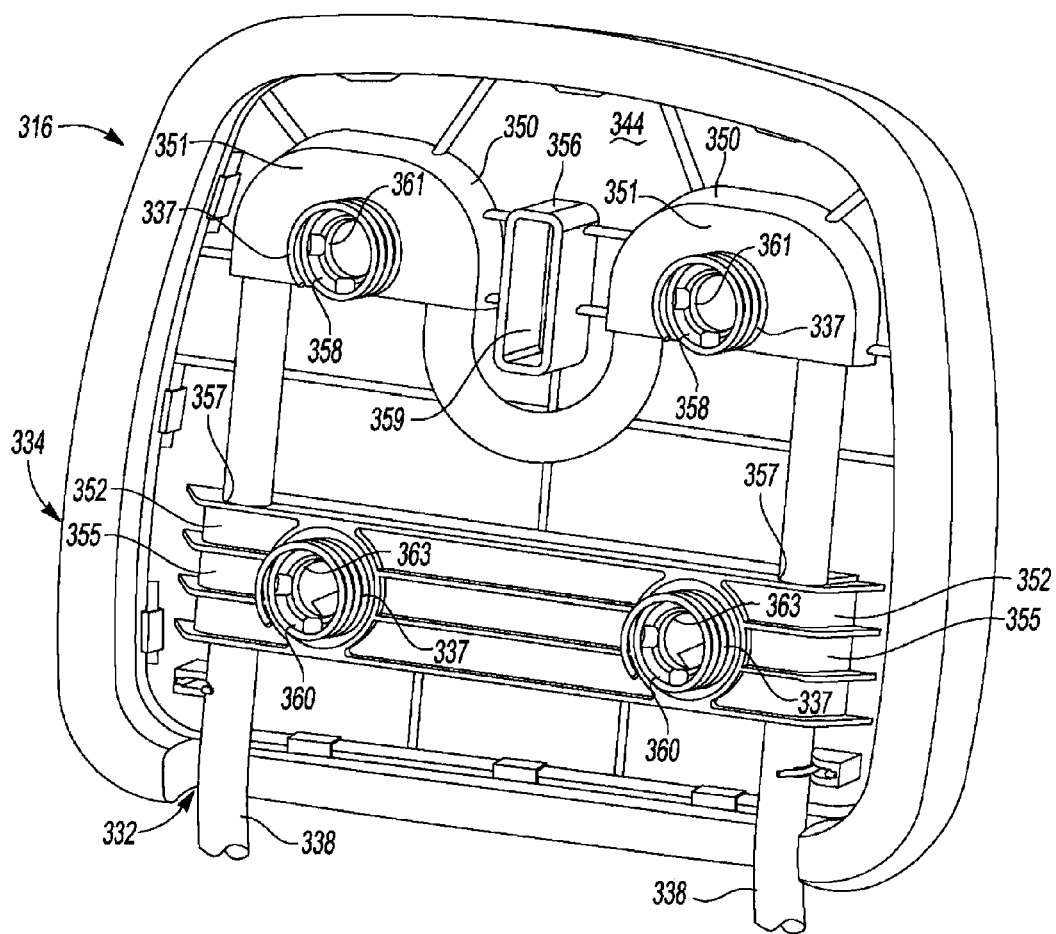
FIG. 14 is a perspective view of a front housing of another head restraint assembly according to the principles of the present disclosure.
Figure 15:
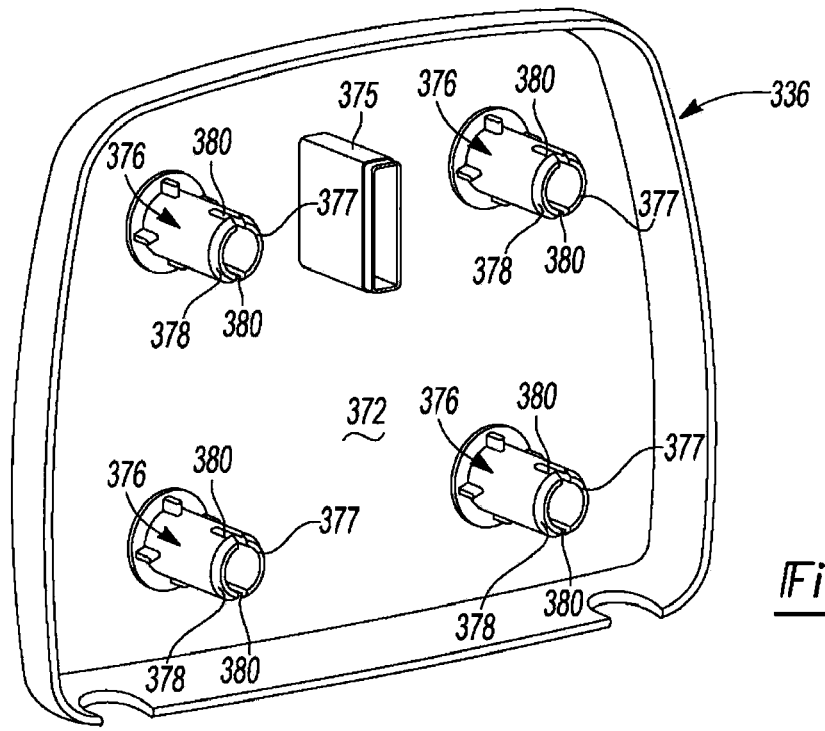
FIG. 15 is a perspective view of a rear housing of the head restraint assembly.
Figure 16:
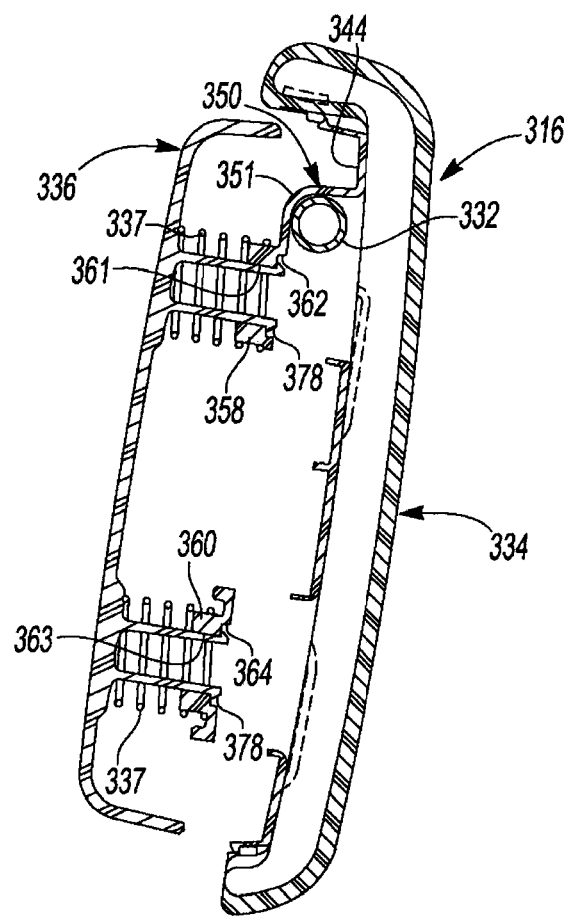
FIG. 16 is a cross-sectional view of the head restraint assembly.

With reference to FIGS. 14-16, another head restraint assembly 316 is provided that may be incorporated into the seat 10. The head restraint assembly 316 may include a support member 332, a front housing 334, and a rear housing 336. The support member 332, front housing 334, and rear housing 336 may be substantially similar to the support member 32, front housing 34, and rear housing 36, respectively, apart from any exceptions noted below and/or depicted in the figures.

The front housing 334 may include an inner surface 344 having a plurality of first attachment members 350, a second attachment member 352, a first projection 356, a plurality of second projections 358, and a plurality of third projections 360. The first attachment members 350 may include bosses 351 integrally formed in the inner surface 344 and extending outward therefrom. Pockets 353 may be formed in the bosses 351 that receive U-shaped portions of the support member 332. The second attachment member 352 may include a raised surface 355 that may be integrally formed with the inner surface 344. A pair of apertures 357 may be formed in the raised surface 355 and may engage vertically extending members 338 of the support member 332 via a press fit or snap fit, for example.

The first projection 356 may be integrally formed with the inner surface 344 and may include an aperture 359. The second projections 358 may be integrally formed with the bosses 351, and the third projections 360 may be integrally formed with the raised surface 355. The second and third projections 358, 360 may be generally tubular members and may include first and second apertures 361, 363, respectively. The first and second apertures 361, 363 may include annular recesses 362, 364, respectively, (FIG. 16). A plurality of spring members 337 may engage outer surfaces of the second and third projections 358, 360 and may extend outward therefrom toward the rear housing 336.

The rear housing 336 may include an inner surface 372 having a first protuberance 375 and a plurality of integrally formed second protuberances 376 extending outward therefrom toward the front housing 334. The first protuberance may slidably engage the aperture 359 in the first projection 356 of the front housing 334. The second protuberances 376 may be generally tubular members including an open end 377 having an annular barb 378 formed thereon. A plurality of slots 380 may be formed in the second protuberances 376 to allow the open end 377 to resiliently flex in a radially inward direction. Each of the second protuberances 376 may be slidably received in a corresponding one of the second and third projections 358, 360 such that the annular barbs 378 may engage the corresponding one of the annular recesses 362, 364 when the head restraint assembly 316 is in the first position (i.e., the first thickness), as shown in FIG. 16.

As described above with respect to the head restraint assembly 16, a force may be applied to the rear housing 336 to urge the rear housing 336 toward the front housing 334. When such a force is applied to the rear housing that is sufficiently strong to overcome the biasing force of the spring members 337, the second protuberances 376 may slide within the second and third projections 358, 360 as the rear housing 336 moves toward the front housing 334 (i.e., into the second position).

With reference to FIGS. 17-20, another head restraint assembly 416 is provided that may be incorporated into the seat 10. The head restraint assembly 416 may include a support member 432, a front housing 434, and a rear housing 436. The support member 432, front housing 434, and rear housing 436 may be substantially similar to the support member 32, front housing 34, and rear housing 36, respectively, apart from any exceptions noted below and/or depicted in the figures.

The front housing 434 may include an inner surface 444, a plurality of first attachment features 438, and a pair of projections 440. Each of the first attachment features 438 may be integrally formed with the inner surface 444 and may include an aperture 446 and a slot 448 extending outward from the aperture 446. A hinge pin 450 may be inserted into the slots 448 and snap into engagement with the apertures 446. The hinge pin 450 may be rotatable within the apertures 446.

The projections 440 may be resiliently flexible members that are integrally formed with the inner surface 444 and extend outward therefrom toward the rear housing 436. The projections 440 may be disposed adjacent each other and spaced apart from each other. The projections 440 may include barbed tips 452 extending inward toward each other.

Figures 19, 20:
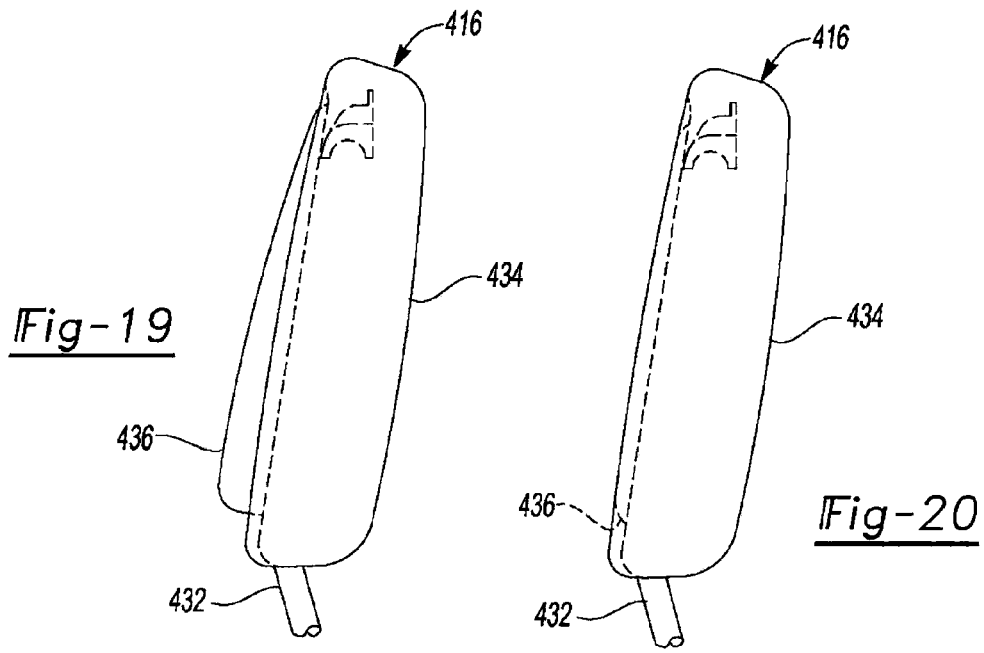
FIG. 19 is a side view of the head restraint assembly in a first position and having a first thickness.
FIG. 20 is a side view of the head restraint assembly in a second position and having a second thickness.

The rear housing 436 may include an inner surface 472, a plurality of second attachment features 454 and a protuberance 476. Each of the second attachment features 454 may be integrally formed with the inner surface 472 and may include an aperture 478 and a slot 480 extending outward from the aperture 478. The hinge pin 450 may be inserted into the slots 480 and snap into engagement with the apertures 478. In this manner, the rear housing 436 may be pivotable about the hinge pin 450 relative to the front housing 434 between the first position (FIG. 19) and the second position (FIG. 20). As described above, the head restraint assembly 416 includes a first thickness in the first position and a second thickness that is less than the first thickness in the second position.

The protuberance 476 may be integrally formed with the inner surface 472 and may extend outward therefrom toward the front housing 434. The protuberance 476 may include a barb 482 disposed on a distal end thereof. The barb 482 may extend laterally outward from the protuberance 476 in two opposing directions. The protuberance 476 may be inserted between the pair of projections 440 in the front housing 434 such that the barb 482 of the protuberance 476 engages the barbed tips 452 of the projections 440 when the head restraint assembly 416 is in the first position. In this manner, the engagement of the projections 440 and the protuberance 476 may limit the pivotal movement of the rear housing 436 away from the front housing 434 while allowing pivotal movement of the rear housing 436 toward the front housing 434.

Figure 17:
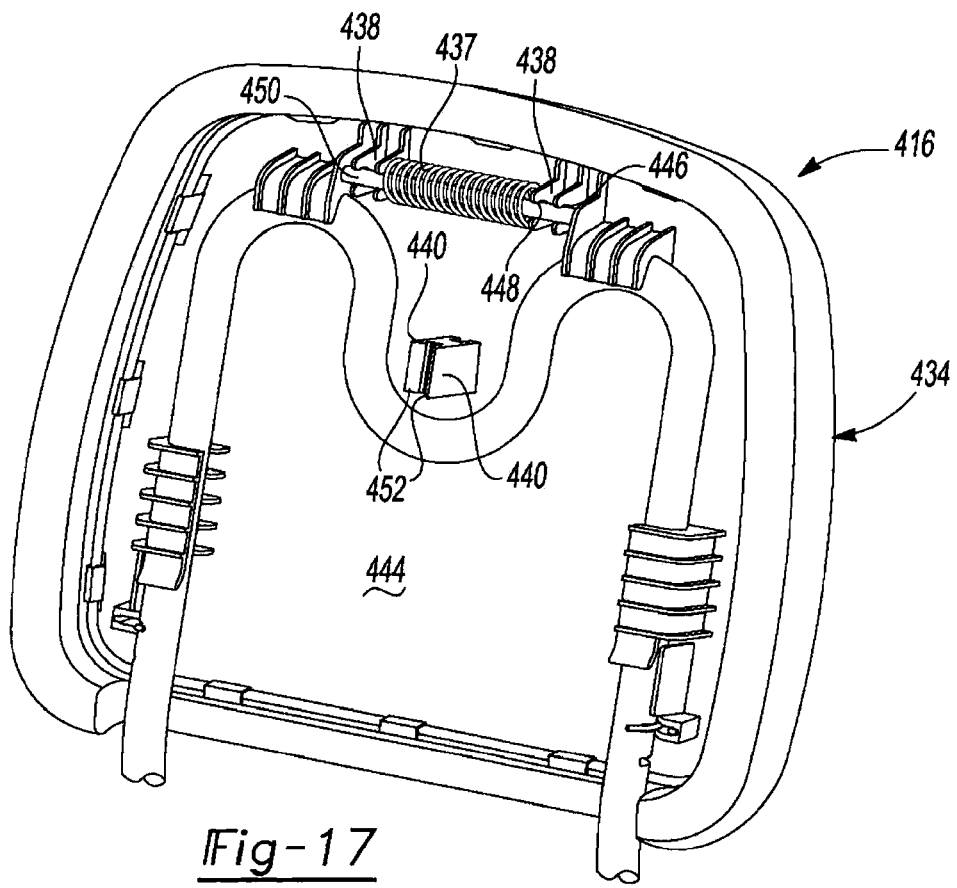
FIG. 17 is a front housing of another head restraint assembly according to the principles of the present disclosure.
Figure 18:
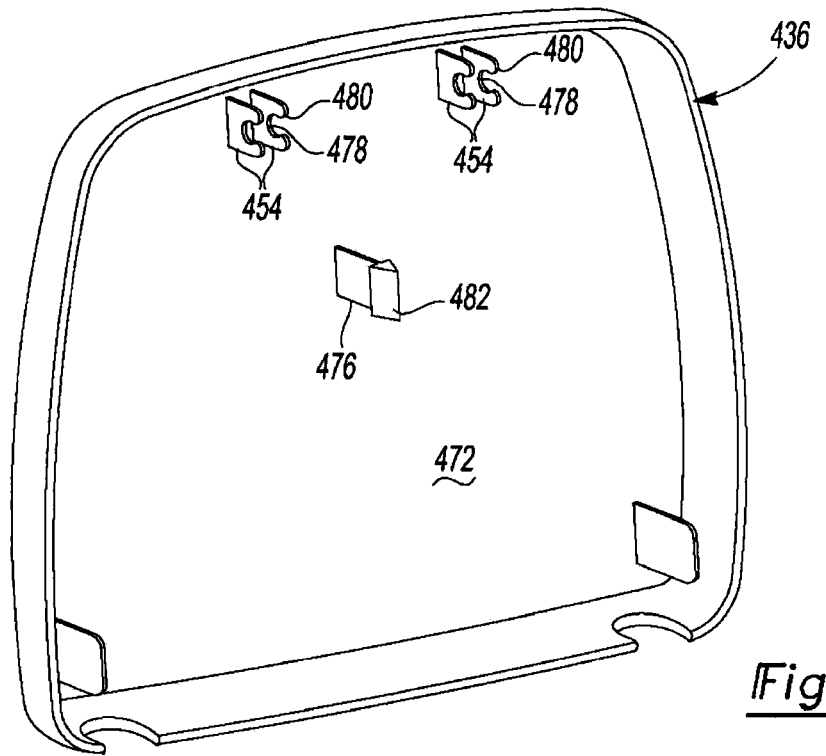
FIG. 18 is a perspective view of the rear housing of the head restraint assembly.

A spring member 437 may be disposed between the inner surfaces 444, 472 of the front and rear housings 434, 436, respectively, and may bias the rear housing 436 away from the front housing 434 (i.e., toward the second position. The spring member 437 may be a torsion spring engaging the hinge pin 450, as shown in FIG. 17, and may resist relative pivotal motion between the front and rear housings 434, 436 or resist rotational movement of the hinge pin 450 relative to the front and/or rear housing 434, 436. In some embodiments, the spring member 437 may be a leaf spring or a coil spring engaging the inner surfaces 444, 472 of the front and rear housings 434, 436 to bias the rear housing 436 away from the front housing 434.

Figure 21:
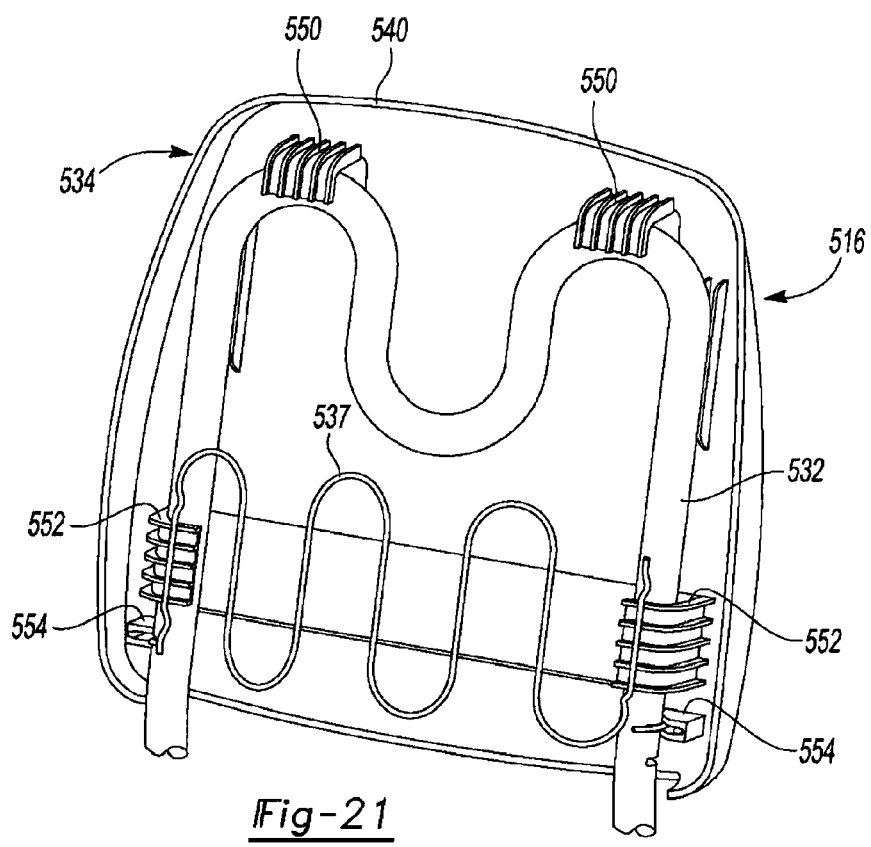
FIG. 21 is a front shell portion of another head restraint assembly according to the principles of the present disclosure.
Figure 22:
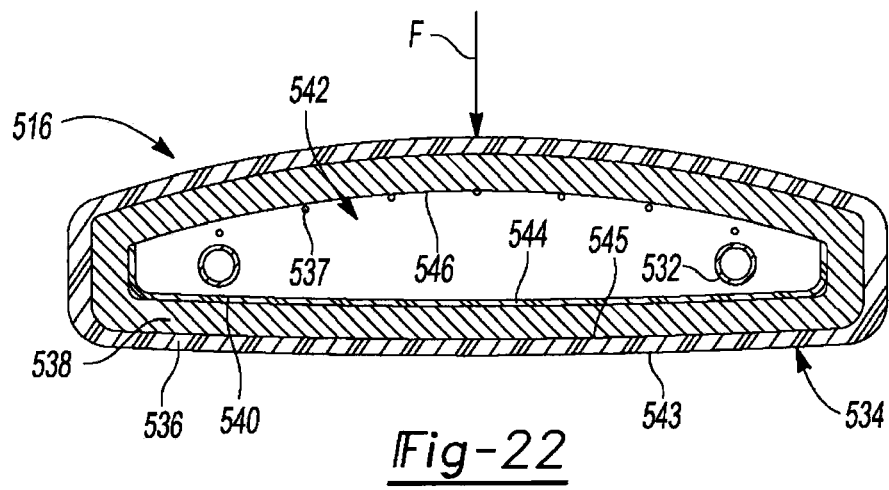
FIG. 22 is a cross-sectional view of the head restraint assembly.

With reference to FIGS. 21 and 22, another head restraint assembly 516 is provided that may be incorporated into the seat 10. As described above with respect to the head restraint assembly 16, a thickness of the head restraint assembly 516 may be adjustable between the first and second thicknesses in response to application and removal of a compression force F acting thereon. The head restraint assembly 516 may include a support member 532 and a housing 534. The support member 532 may be substantially similar to the support member 32 described above, and therefore, will not be described again in detail.

The housing 534 may be a generally hollow member including a outer layer 536, a resiliently compressible padding layer 538, and a front shell member 540 (FIG. 22). The padding layer 538 and the front shell member 540 may define a cavity 542. The outer layer 536 may be formed from a cloth, leather and/or any other upholstery material and may encase the padding layer 538. The outer layer 536 may include a front-facing surface 543 and a rear-facing surface 545. The padding layer 538 may be formed from a resilient foam or elastomeric material, for example, and may include a front inner surface 544 and a rear inner surface 546.

The front shell member 540 may be formed from a relatively rigid polymeric or metallic material, for example, and may engage the front inner surface 544. The front shell member 540 may include a plurality of first attachment members 550, a plurality of second attachment members 552, and a plurality of third attachment members 554 extending toward the rear inner surface 546. The first, second and third attachment members 550, 552, 554 may be substantially similar to the first, second and third attachment members 50, 52, 54 described above, and therefore, will not be described again in detail. Briefly, the first, second and third attachment members 550, 552, 554 may engage the support member 532 and may cooperate to fixedly secure the housing 534 to the support member 532. A spring member 537 such as a sinus spring, for example, may engage the second attachment members 552 via a snap fit and may biasingly engage the rear inner surface 546 of the padding layer 538. The spring member 537 may bias the rear inner surface 546 away from the front inner surface 544 (i.e., toward the first position, as shown in FIG. 22).

The force F may be applied to the rear-facing surface 545 urging the rear-facing surface 545 and the rear inner surface 546 of the padding layer 538 may overcome the biasing force of the spring member 537 allowing the thickness of the housing 534 to be reduced to the second thickness. Removal of the force F may allow the spring member 537 to urge the rear-facing surface 545 and the rear inner surface 546 back toward the first position.

Figure 23:
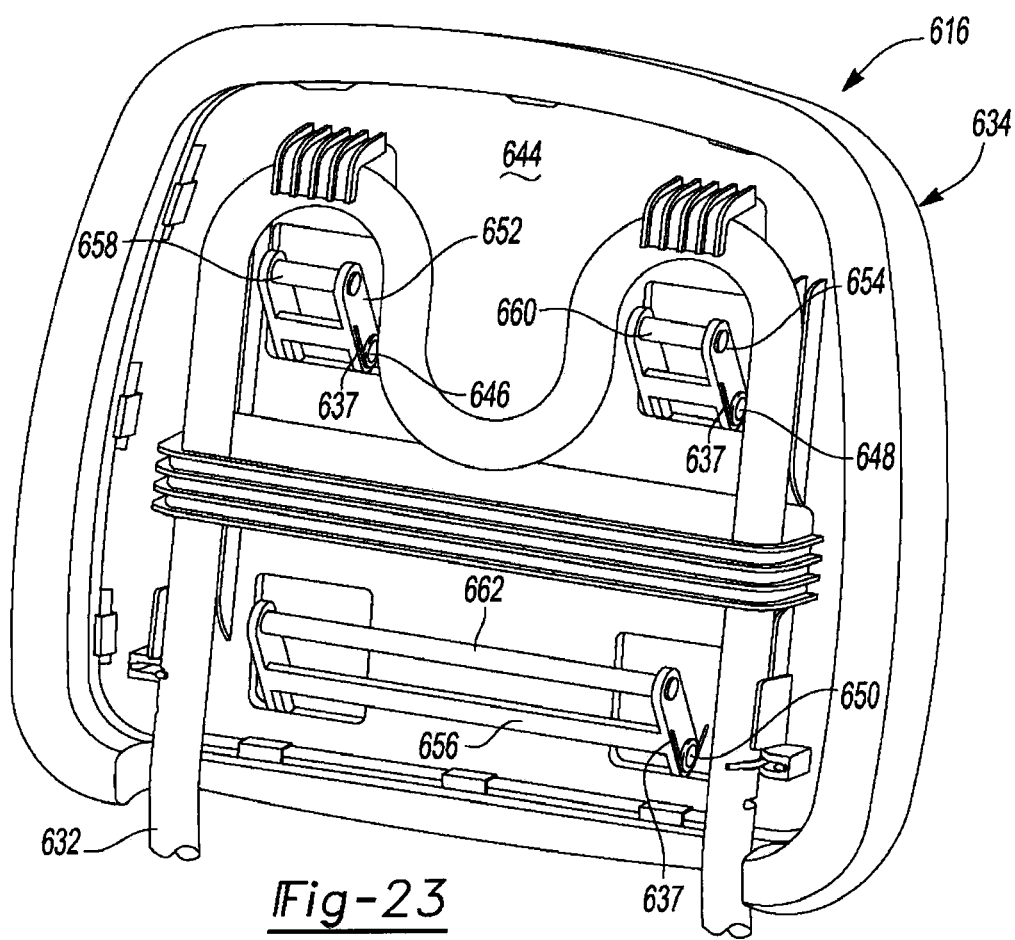
FIG. 23 is a front housing of another head restraint assembly according to the principles of the present disclosure.
Figure 24:
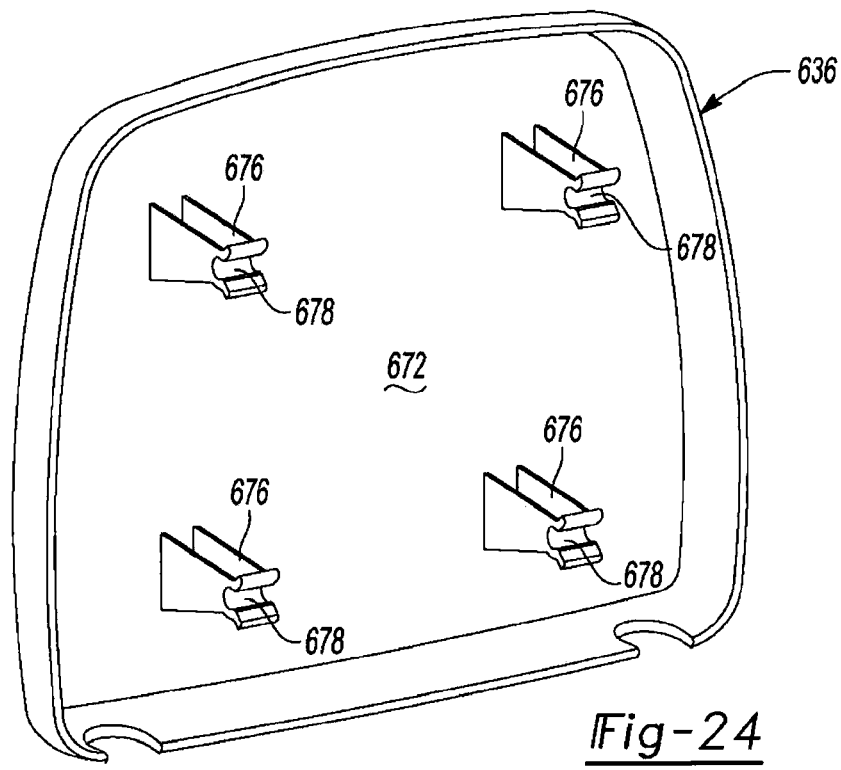
FIG. 24 is a perspective view of the rear housing of the head restraint assembly.

With reference to FIGS. 23 and 24, another head restraint assembly 616 is provided that may be incorporated into the seat 10. The head restraint assembly 616 may include a support member 632, a front housing 634, and a rear housing 636. The structure and function of the support member 632 and the front and rear housings 634, 636 may be substantially similar to that of the support member 32 and the front and rear housings 34, 36 described above, apart from any exceptions noted below and/or depicted in the figures.

The front housing 634 may include an inner surface 644 having first, second and third hinges 646, 648, 650 mounted thereto. First, second and third link members 652, 654, 656 may be connected to the first, second and third hinges 646, 648, 650, respectively, to enable the first, second and third link members 652, 654, 656 to pivot relative to the front housing 634. The first, second and third link members 652, 654, 656 may include first, second and third hinge pins 658, 660, 662, respectively.

The rear housing 636 may include an inner surface 672 including a plurality of protuberances 676 extending therefrom. The protuberances 676 may be integrally formed with the inner surface 672 and may include engagement slots 678 disposed at distal ends thereof. Each of the engagement slots 678 may engage a corresponding one of the hinge pins 658, 660, 662 of the link members 652, 654, 656, respectively, via a snap fit.

In this manner, the front housing 634, the link members 652, 654, 656, and the rear housing 636 may cooperate to form a four-bar linkage that is rotatable between a first position and a second position. As described above, the head restraint assembly 616 may include a first thickness in the first position and a second thickness in the second position that is less than the first thickness.

One or more spring members 637 may be disposed between the front and rear housings 634, 636 to bias the rear housing 636 toward the first position. The spring members 637 may be torsion springs, for example, engaging the inner surface 644 of the front housing 634 and one or more of the link members 652, 654, 656. In some embodiments, the spring members 637 could be a coil spring or a leaf spring engaging the inner surfaces 644, 672 of the front and rear housings 634, 636, respectively, for example.

The link members 652, 654, 656 may extend substantially perpendicular relative to the inner surface 644 of the front housing 634 when the head restraint assembly 616 is in the first position. To move the head restraint assembly 616 into the second position, the link members 652, 654, 656 may be rotated upward such that the hinge pins 658, 660, 662 of the link members 652, 654, 656 are facing upward (relative to the view shown in FIG. 23).

Figure 25:
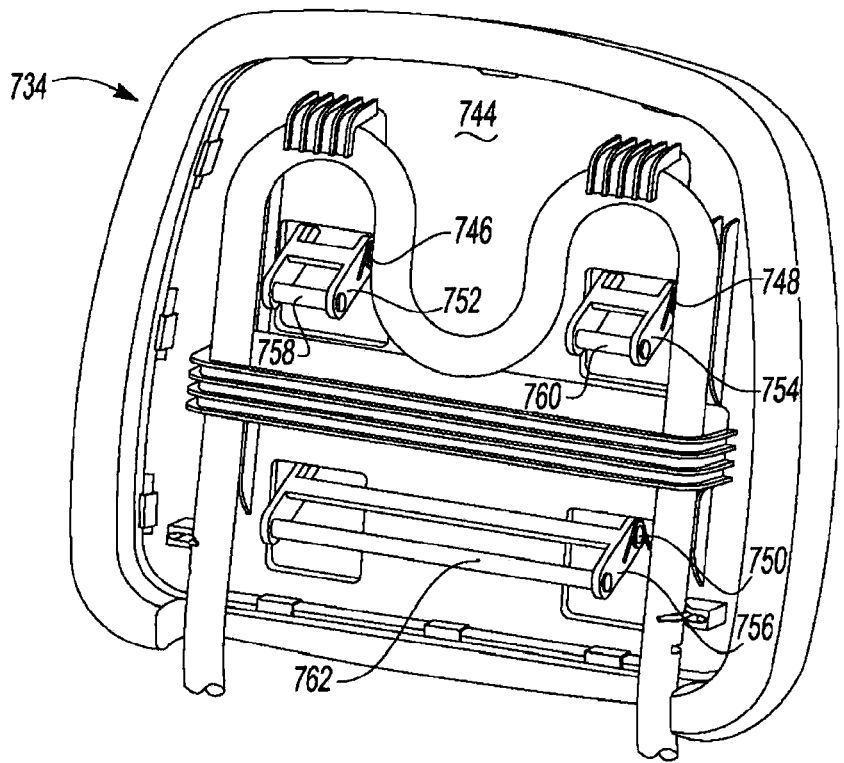
FIG. 25 is perspective view of another front housing according to the principles of the present disclosure.

With reference to FIG. 25, another front housing 734 is provided that may be incorporated into the head restraint assembly 616. The structure and function of the front housing 734 may be substantially similar to that of the front housing 634, apart from any exceptions noted below and depicted in the figures.

The front housing 734 may include an inner surface 744 having first, second and third hinges 746, 748, 750 mounted thereto. First, second and third link members 752, 754, 756 may be connected to the first, second and third hinges 746, 748, 750, respectively, to enable the first, second and third link members 752, 754, 756 to pivot relative to the front housing 734. The first, second and third link members 752, 754, 756 may include first, second and third hinge pins 758, 760, 762, respectively, that may engage the protuberances 676 of the rear housing 636.

The link members 752, 754, 756 may extend substantially perpendicular relative to the inner surface 744 of the front housing 734 when the head restraint assembly 616 is in the first position. To move the head restraint assembly 616 into the second position, the link members 752, 754, 756 may be rotated downward such that the hinge pins 758, 760, 762 of the link members 752, 754, 756 are facing downward (relative to the view shown in FIG. 23).

What is claimed is:

1. A vehicle seat comprising:
a seat bottom;
a seatback engaging said seat bottom and movable relative thereto between a normal use position and a second position; and
a head restraint coupled to said seatback and including front and rear portions attached to each other for relative movement therebetween, said front and rear portions defining a first thickness when said seatback is in said normal use position and a second thickness when said seatback is in said second position, said second thickness is less than said first thickness, said rear portion being at least partially received in said front portion in said second position, said rear portion being movable relative to said seatback without moving said front portion.

2. The vehicle seat of claim 1, further comprising a support member supporting said head restraint and pivotably attached to said seatback.

3. The vehicle seat of claim 1, wherein said head restraint is resiliently compressible from said first thickness to said second thickness.

4. The vehicle seat of claim 1, wherein said second position is a stowed position.

5. The vehicle seat of claim 1, wherein said head restraint includes a spring member biasing said front and rear portions away from each other.

6. The vehicle seat of claim 5, wherein said head restraint includes a linkage movably connecting said front and rear portions to each other for movement between said first and second thicknesses.

7. The vehicle seat of claim 6, wherein said linkage includes a hinge.

8. The vehicle seat of claim 6, wherein said linkage includes a first member attached to one of said front and rear portions and an aperture in another of said front and rear portions, said first member slidably engaging said aperture.

9. The vehicle seat of claim 6, wherein said linkage includes a four-bar linkage.

10. A comprising:
a seatback; and
a head restraint mounted to the seatback and including:
a support member engaging the seatback;
a front portion attached to said support member, and
a rear portion connected to said front portion, said rear portion movable between first and second positions relative to said front portion and said support member without moving said front portion relative to said support member, said first and second portions cooperating to form a head restraint body having a first thickness in said first position and a second thickness in said second position,
wherein said second thickness is less than said first thickness.

11. The seat of claim 10, wherein said support member is pivotably attached to the seatback of the seat.

12. The seat of claim 10, wherein said head restraint is resiliently compressible from said first thickness to said second thickness.

13. The seat of claim 10, wherein said first position is a normal use position and said second position is a stowed position.

14. The head restraint seat of claim 10, further comprising a spring member biasing said front and rear portions away from each other.

15. The seat of claim 14, further comprising a linkage movably connecting said front and rear portions to each other for movement between said first and second thicknesses.

16. The seat of claim 15, wherein said linkage includes a hinge.

17. The seat of claim 15, wherein said linkage includes a four-bar linkage.

18. The seat of claim 15, wherein said linkage includes a first member attached to one of said front and rear portions and an aperture in another of said front and rear portions, said first member slidably engaging said aperture.

* * * * *